Aug. 5, 1924.
A. F. MASURY
STEERING KNUCKLE
Filed May 31, 1921
1,503,511
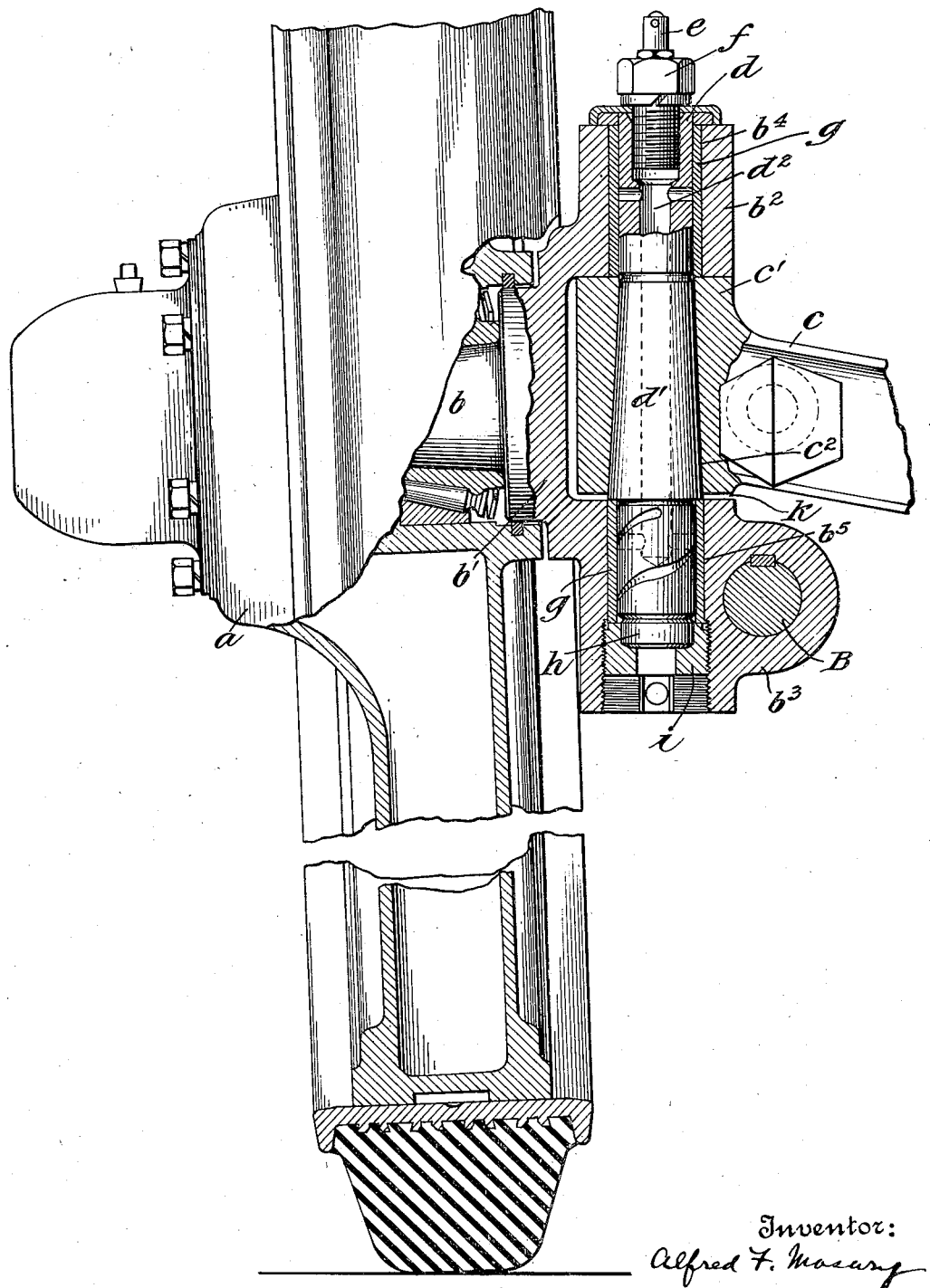

Patented Aug. 5, 1924.

1,503,511

UNITED STATES PATENT OFFICE.

ALFRED F. MASURY, OF NEW YORK, N. Y., ASSIGNOR TO INTERNATIONAL MOTOR COMPANY, OF NEW YORK, N. Y., A CORPORATION OF DELAWARE.

STEERING KNUCKLE.

Application filed May 31, 1921. Serial No. 473,814.

*To all whom it may concern:*

Be it known that I, ALFRED F. MASURY, a citizen of the United States, residing in the borough of Manhattan of the city of New York, in the State of New York, have invented certain new and useful Improvements in Steering Knuckles, of which the following is a specification, reference being had to the accompanying drawing, forming a part hereof.

This invention relates to improvements in and about steering knuckles and is concerned particularly with improved means for mounting the same pivotally on an axle. Considerations which enter into a mounting for steering knuckles are, among others, strength, minimum friction in the pivot, tightness against lost motion, adjustability for wear, and facility in assembling and disassembling. All of these considerations have been taken into account in the improved construction to the end that a very simple, accessible and efficient mounting might be afforded for the steering knuckles of motor vehicles.

In accordance with the invention the weight of the vehicle is transmitted to the steering pin through a conical bearing surface of relatively large superficial area. The thrust on the pin is taken on a hardened thrust button mounted adjustably in the knuckle. The relation of parts is such that this button can be fixed in such relation to the pin that the axle can be maintained in fixed relation to the knuckle and held against such shocks as might come from 'lost motion.

The invention will be described in connection with one suitable embodiment illustrated in the accompanying drawing which shows a fragment of a motor vehicle wheel (partly in section), a fragment of an axle (partly in section) and the improved mounting between the axle and the steering knuckle for the wheel.

The vehicle wheel $a$ is journaled on the spindle $b$ of a forked knuckle $b'$ of approved form having an upper arm $b^2$ and a lower arm $b^3$ in accordance with present day practise. A steering arm is indicated at B. The vehicle axle $c$ has its end $c'$ formed to rest between the upper and lower arms $b^2$, $b^3$ and has a downwardly tapered opening $c^2$ therethrough adapted to aline generally with alined openings $b^4$, $b^5$ in the upper and lower arms $b^2$, $b^3$, respectively. A knuckle pin $d$ may be passed up through said alined openings $b^5$, $c^2$, $b^4$, and is formed with a tapered section $d'$ similar to the tapered bore $c^2$ through the axle end $c'$, thereby affording a bearing seat for the axle of relatively large superficial area. The knuckle pin $d$ may be drilled with suitable grease channels $d^2$ through which a lubricant, which may be introduced at the cup $e$, may pass. A nut $f$, co-operating with the threaded portion formed with or carried by the upper end of the pin $d$, will serve to draw the tapered section $d'$ of the pin firmly against its tapered seat and hold it there. Bushings $g$ for the upper and lower cylindrical ends of the pin may be interposed between them and the upper and lower arms $b^2$, $b^3$ of the knuckle.

In accordance with the present invention the load of the vehicle, which is transmitted to the pin $d$ through the tapered bearing surface $d'$ thereof, is impressed on the lower arm $b^3$ of the knuckle $b'$ through a hardened thrust button, indicated at $h$. This button seats in a recess provided in the upper end of an adjusting screw $i$ which is threaded into the underside of the arm $b^3$ and may be locked in adjusted position. It has been found to be the best practise to provide a clearance, indicated at $k$, between the lower surface of the axle end $c'$ and the upper surface of the lower arm $b^3$ and to press the upper surface of the axle end against the lower surface of the upper arm $b^2$. In the improved construction this relation is readily secured by setting up on the adjusting screw $i$ until the thrust button $h$ carries the pin $d$ with the axle $c$ upwardly until the axle end $c'$ engages the upper arm $b^2$ of the knuckle. At this time the clearance $k$ will be provided. The practical advantage of this relation resides in the fact that the upward and downward movements of the axle $c$ will always be accompanied by corresponding movements of the knuckle $b'$ and wheel $a$.

The construction is very simple and efficient. The lubrication is adequate. The parts are held in such relation as to result in minimum friction on the pivot and no lost motion thereabout which might injure the parts. In assembling and disassembling the operations are very simple and may be carried on with ordinary tools. The backing out or setting up of the adjusting screw *i* will cause corresponding movement of the thrust button *h* and since this button takes the entire thrust from the pin *d* the position of the pin with relation to the knuckle is determined.

I claim as my invention:

In combination with a steering knuckle and vehicle axle provided with a vertically tapered opening through its end, a tapered knuckle pin passing through the tapered opening and supporting the axle, the steering knuckle being provided in its upper and lower arms with openings for the upper and lower ends of the knuckle pin, a screw threaded adjustably in the lower arm of the knuckle in line with the pin, said screw having a recess in its upper face, a hardened thrust button having parallel upper and lower faces seated horizontally in said recess and presenting an upper bearing surface of substantially the same area as the lower bearing surface of the pin and on which the pin is directly supported.

This specification signed this 27th day of May A. D. 1921.

ALFRED F. MASURY.